March 5, 1940.  G. R. CUNNINGTON  2,192,517
COMPOSITE LAMINATED INSULATION MATERIAL
Filed June 17, 1937
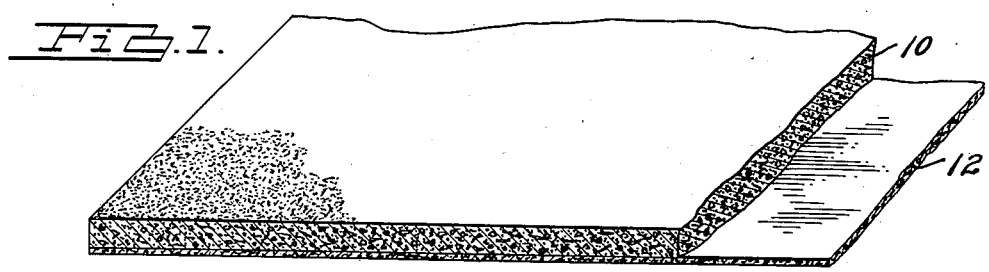
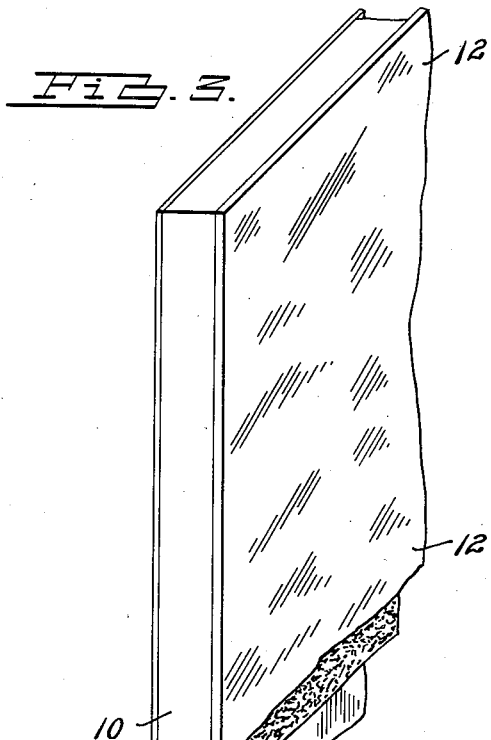
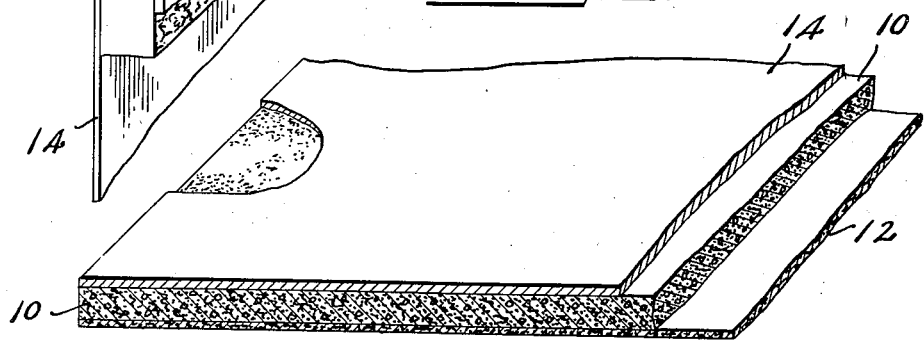
INVENTOR.
George R. Cunnington
BY
Parker & Burton
ATTORNEYS Patented Mar. 5, 1940

2,192,517

UNITED STATES PATENT OFFICE 2,192,517

COMPOSITE LAMINATED INSULATION MATERIAL

George R. Cunnington, Detroit, Mich., assignor to Woodall Industries Incorporated, Detroit, Mich., a corporation of Michigan Application June 17, 1937, Serial No. 148,696

3 Claims. (Cl. 154—2)

This invention relates to an improved laminated insulation structure and particularly to a sheet embodiment thereof which is adaptable under the influence of heat of adhering itself to a foundation or supporting sheet. This invention constitutes an improvement upon the invention described in copending application Serial No. 119,414, filed January 7, 1937.

This particular invention incorporates the desirable characteristics and qualities of the structure described in such identified application with the additional characteristic of a more secure and more permanent adhesion to the supporting sheet. The adhesion obtained with the invention here disclosed is one wherein the bond formed between the supporting sheet and the insulation material is such as to permit the composite structure to be positioned vertically or even with the supporting sheet above the insulating sheet without the insulating sheet becoming loose or detached.

The insulating layer as described in the above identified application comprises a composition asphaltic mastic wherein light weight structural filler particles are mixed throughout an asphaltic mass. Preferably and as described in such application filler particles constitute the major portion of the mastic layer by bulk but a minor portion thereof by weight and are scattered loosely and at random throughout the asphaltic mass. The asphaltic content is provided in an excess amount whereby when the composite sheet is subjected to a determined temperature the asphalt will spew from such sheet and adhere itself to a supporting surface as, for example, a sheet of metal.

This invention comprises incorporating in the mastic upon the surface intended for adhesion to the supporting sheet a solidifying, stiffening, or hardening agent which, upon the asphaltic mass being subjected to a temperature sufficient to produce adhesion, will interact with the moisture and asphalt and cause said surface portion to set up and harden rendering the same so viscous that a subsequent reheating to the same temperature will not render such surface portion sufficiently fluid to permit detachment or release of the mastic layer from the supporting sheet.

Insulating material of the character described has one important use in the automobile industry to dampen the vibration of the sheet metal panels of automobile bodies and to improve the vehicle from an acoustic point of view. In such use the preferred method of obtaining adhesion is to place the insulation material in sheet form upon a metal supporting panel before the board has passed through the heat treatment ovens in the finishing of the body. During the movement of the body through such heat treatment ovens the insulation layer adheres itself to the metal sheet. In the continuation of the finishing operation of the body it may be again passed at a subsequent stage in its completion through the heat finishing ovens.

An object of the invention is to provide an adhesion so secure that the insulation sheet of asphaltic mastic will not become loose or detached from its supporting metal sheet during such subsequent heat treatment of the body. During the adhesion of the asphaltic mastic layer to the metal sheet the surface portion of the mastic layer which is adhered to the metal sheet is stiffened and solidified and rendered many times more viscous than would be the case were the solidifying agent omitted.

Other objects, advantages and meritorious features of this invention will more fully appear from the following description, appended claims, and accompanying drawing, wherein:

Figure 1 is a fragmentary perspective of a mastic layer illustrating my invention, Fig. 2 is a perspective of a fragment of such mastic layer supported upon a metal sheet, and Fig. 3 is a fragmentary perspective of the complete laminated structure including the metal sheet and the mastic layer.

The make up of the composition asphalt mastic is fully described in the copending application above identified. The bulk forming filler constituent may be made up of reclaimed tire fibers which, while having most of the rubber removed, still carry a residue of rubber adhered thereto. Hulls of grain, such as oat hulls, may be used. Shredded corn stalks or other similar material may be employed. Preferably the fibers are relatively springy and also preferably they are relatively non-absorbent of asphalt or are rendered so by saturation prior to incorporation in the asphalt.

Filler particles or structural material fibers may be mixed with the asphaltic mass in a vat or other mixing chamber. The asphaltic mass is fluid at the time of mixing. Asphalt of any desired melt point may be used, the melt point will depend upon the temperature of adhesion at which the mastic is to be adhered to its supporting sheet. Asphalts of varying melt points are readily available.

The asphalt and structural filler is mixed together in proportions which will insure at all times an excess of asphaltic content in the mastic sheet. By an excess of asphalt content is meant that there is present in the mastic sheet asphalt in excess of that taken up by the filler fibers in their saturation or required for bonding the filler particles together. The asphalt would constitute, depending upon conditions, 65% to 85% by weight of the total mass while the filler particles make up the remainder.

Structural filler however is provided in a sufficient quantity to restrain the asphalt, at the temperature at which adhesion results, from flowing or spreading out over the surface of the supporting sheet as the asphalt without such restraint would do. Following mixing of the filler particles with the asphalt in the vat the mastic is passed out and through an extruding machine and compacted into sheet form. The asphaltic fibrous mastic in sheet form is indicated in the drawing as 10. A sheet of material such as asphalt saturated felt or laminated asphalted crepe paper, such as is sold under the trade name of X-crepe, or a sheet formed of a latex-cellulose composition such as is commercially sold under the name of Lexide, or other strong flexible moisture resistant sheet material may be secured to one surface of the mastic layer. A sheet of asphalt saturated felt is here illustrated and indicated by the reference numeral 12. This sheet 12 is juxtaposed upon mastic layer 10 while the mastic layer is sufficiently hot to adhere thereto and the two laminations are compacted together. This may be done by rolls between which the layers are passed or as desired.

There may then be dusted upon that surface of the asphaltic mastic opposite the asphalted felt covered surface thereof an ingredient which is adapted to react with the fluid asphalt at the temperature of adhesion to produce hardening and solidifying of the asphalt rendering the same more stiff and viscous. Any stable oxide that will react with water at the temperature of adhesion and will produce drying and stiffening of the asphalt may be used. Lime is a suitable ingredient. Such lime should be dusted or sprinkled over the surface of the asphaltic mastic layer and allowed to remain thereon. At the time of such sprinkling the asphalt is sufficiently tacky so that the lime dust will adhere thereto but it is not sufficiently fluid to produce any interaction therewith.

For the application of the mastic layer to a supporting wall, such as a sheet metal wall panel of an automobile body, the mastic sheet is cut to size to fit the supporting sheet to be covered thereby and it is placed thereon before the body goes through the heat treatment ovens. If the mastic layer is to be applied to the side of a metal door panel the door may be removed from the body and placed flat on the carrier and the mastic layer laid thereon. The lime covered surface of the mastic sheet is the one which is placed directly upon the supporting metal sheet. In the drawing a fragment of such sheet is indicated as 14. Fig. 2 shows the mastic layer supported thereupon before adhesion and before the same has been passed through the heat treatment ovens.

As the sheet metal panel with its supported mastic layer goes through the heat the asphalt is rendered fluid and flows or spews downwardly upon the metal sheet to bond the mastic layer thereto. When the asphalt is fluid the lime interacts therewith and when the asphalt hardens upon the structure being removed from the heat and during the cooling thereof the interaction of the lime causes it to harden and solidify to a substantially greater extent than would otherwise be the case. This solidification is along the adhered portion only as it is only at such portion that the lime is interacted with the asphalt. The interaction of the lime and asphalt has rendered the asphalt substantially more viscous than it previously was. Its viscosity has been increased to such a point that a subsequent heating to the same temperature will not produce loosening thereof from the metal sheet as might otherwise be the case. The bond is so secure that after the asphalt has hardened the door can be placed in vertical position without the mastic layer becoming loose or detached.

The bond is a peculiarly secure and intimate one. That portion of the mastic layer which forms the bond is solid and heats to a degree which would not result without the employment of the lime. Viscosity of the asphalt where the lime is incorporated therewith is increased many fold. As stated, the body may be again passed through the heating ovens at the same temperature in the further finishing of the body without the mastic layer becoming detached.

What I claim is:

1. A laminated structure comprising a metal foundation sheet and a layer of asphaltic mastic adhered thereto by asphalt spewed from the mastic sheet on to the sheet, said mastic sheet having relatively light weight filler particles disposed throughout an asphaltic mass, said spewed asphalt being solidified and hardened by reaction with lime at an elevated temperature.

2. A laminated structure comprising a sheet of metal and a laminated asphaltic sheet, comprising a foundation layer and a layer of asphaltic mastic adhered to said foundation layer, said laminated sheet having its layer of asphaltic mastic juxtaposing said metal sheet and adhered thereto by asphalt spewed from the juxtaposed surface of the layer on to the metal sheet, said mastic layer having lime incorporated in said juxtaposed surface only and having its spewed asphalt which is adhered to the metal sheet solidified and hardened by reaction with said lime at an elevated temperature.

3. That method of fabricating a laminated structure comprising providing a layer of asphaltic mastic, allowing said mastic layer to cool below the spew point of the asphalt, spreading a coating of lime over one surface of the mastic, placing said mastic layer upon a sheet of metal with the lime coated surface of the mastic directly contacting the metal sheet, and applying sufficient heat to such laminated structure to cause asphalt to spew and to adhere to the metal sheet and to react with the lime to solidify and harden such adhered asphalt.

GEORGE R. CUNNINGTON.